United States Patent [19]

Kuroki

[11] 4,040,007

[45] Aug. 2, 1977

[54] APPARATUS FOR WARNING THAT A KEY-OPERATED DEVICE IN A VEHICLE IS INOPERATIVE

[75] Inventor: Shigenobu Kuroki, Miyazaki, Japan

[73] Assignee: Kabushiki Kaisha Honda Rokku, Japan

[21] Appl. No.: 654,730

[22] Filed: Feb. 3, 1976

[30] Foreign Application Priority Data

Feb. 20, 1975  Japan ................................. 50-20336
Apr. 14, 1975  Japan ................................. 50-44349

[51] Int. Cl.² .......................................... B60R 25/02
[52] U.S. Cl. ................................ 340/52 D; 180/114
[58] Field of Search ................... 340/52 D, 63, 64; 307/10 AT; 180/114

[56] References Cited

U.S. PATENT DOCUMENTS

| 3,629,818 | 12/1971 | Hirama | 340/52 D X |
| 3,641,489 | 2/1972 | Shimomura | 340/52 D |
| 3,654,600 | 4/1972 | Yamamoto | 340/52 D |

*Primary Examiner*—Alvin H. Waring

[57] ABSTRACT

An apparatus for warning that a key-operated device in a vehicle is inoperative. The vehicle is provided with a warning buzzer connected in series with one or more door switches that are closed by opening a door. A vibrating member of the buzzer is so arranged that the same is restrained by a control pin which is moved with the key-operated device provided on the vehicle. Additional, optional features of the apparatus are also disclosed.

8 Claims, 6 Drawing Figures

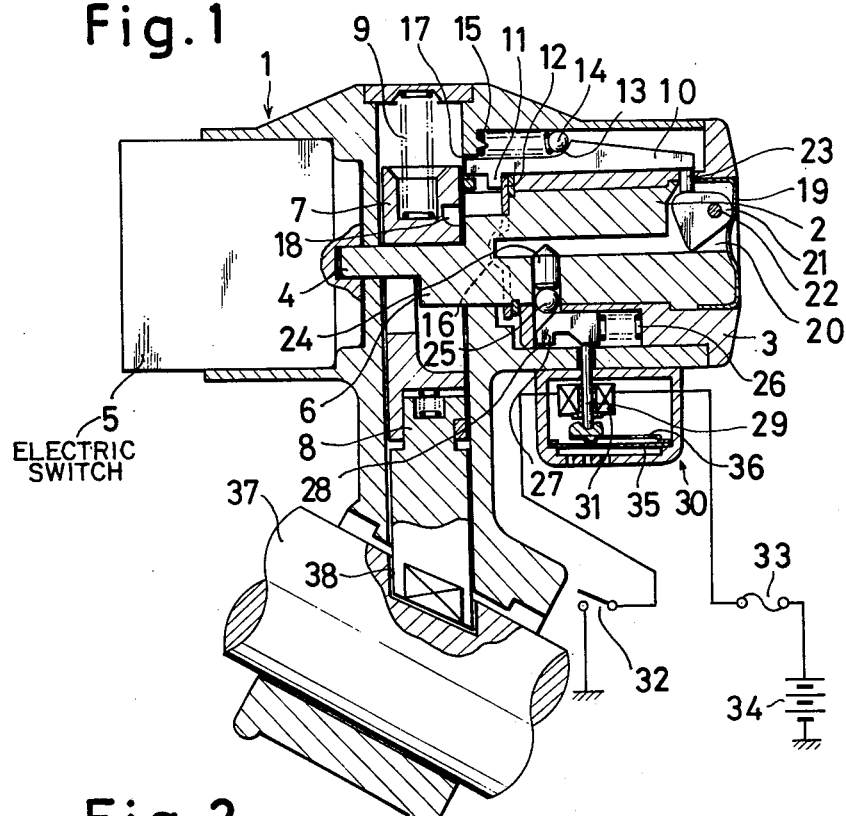
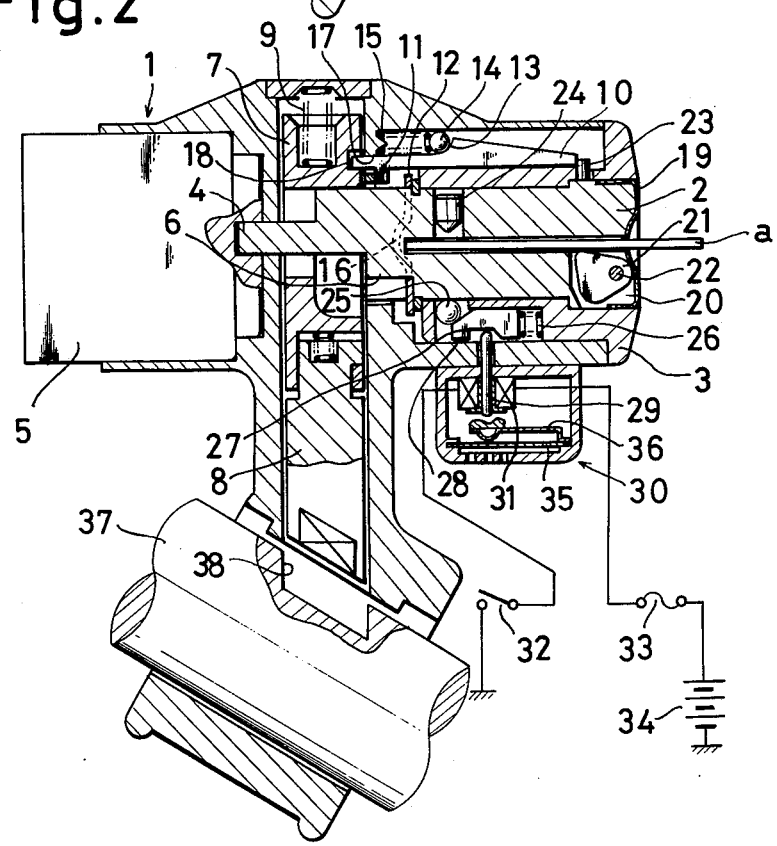

APPARATUS FOR WARNING THAT A KEY-OPERATED DEVICE IN A VEHICLE IS INOPERATIVE

The invention relates to an apparatus for warning that a key-operated device in a vehicle, such as an engine switch of a motor car, operable by a key or a burglar-resistant apparatus, is inoperative, the switch or burglar-resistant apparatus serving to lock and unlock the steering shaft of the motor car, such as when the engine switch is turned on or off.

Key-operated devices of this ind are defective in that, when a driver of the vehicle, before getting out of the vehicle after stopping it, neglects or fails to operate the key-operated device, there is a danger that the vehicle can be stolen. This would happen if the key would remain inserted although the engine switch has been turned OFF, or when the burglar-resistant apparatus provided in the vehicle has not been locked.

To prevent these disadvantages, various types of warning apparatus have been proposed so far in which, when a burglar-resistant apparatus is provided, warning is automatically given when the driver opens the door for getting out of the vehicle. Such warning apparatus is, generally constructed so that, besides one or more door switches that are closed when the door is opened, a switch is provided in the electric circuit of the burglar-resistant apparatus that has to be opened so as to lock the apparatus. Consequently, such known apparatus requires at least two switches to be controlled, which is inconvenient and leads to the possibility that one or more switches are not properly actuated. Additionally, such apparatus is complicated in its assembly and liable to cause trouble in maintenance; also, the prices are relatively high.

The present invention has as one of its objects to remove the inconveniences and disadvantages of hitherto known devices. In accordance with major features of the invention, a warning buzzer is used, and only a single switch which is closed by opening one or more doors is provided. In the electric circuit for the buzzer, there is arranged a vibrating member which is mechanically restrained by a control pin that detects if a key-operated device in the apparatus is left inoperative.

The invention provides a reliable apparatus which is easy to assemble and install and is consequently low in price, and easy to maintain in proper, foolproof operation.

The inoperative condition of the key-operated device can be easily detected on opening of one of the doors, simply in that the electric circuit of the warning buzzer is provided with a single door switch arrangement, the apparatus being mechanical in construction, thereby eliminating difficulties usually encountered with sophisticated electrical and electronic arrangements.

According to further, optional features of the invention a control pin which is movable with a contact member is provided, the latter being slidable by contact when a key is inserted in the key-operated device, and by this arrangement it is prevented that the key is left in the device.

According to further, optional features of the invention, the key-operated device may constitute or be associated with a burglar-resistant apparatus by which the steering shaft of the vehicle is so locked that it cannot be turned, and wherein the earlier-mentioned control pin can be moved via the lock pin of the apparatus, allowing the inoperative condition of the lock pin to be detected, and its operation ensured.

According to yet another optional feature, the warning buzzer is preferably attached to a casing of the burglar-resistant apparatus, inside the vehicle, thereby simplifying the mechanism that allows mechanical ganging of the operative parts with the control pin. This further simplifies construction and assembly.

A preferred, exemplary embodiment of this invention will be described with reference to the accompanying drawings, illustrating a key-operated burglar-resistant apparatus for locking a vehicular steering shaft. In the drawing, FIG. 1 is a sectional side view of a preferred example of the inventive apparatus in its locking condition;

FIG. 2 is a sectional side view of the apparatus in its unlocking condition, with an engine switch being ON;

Figure 3:
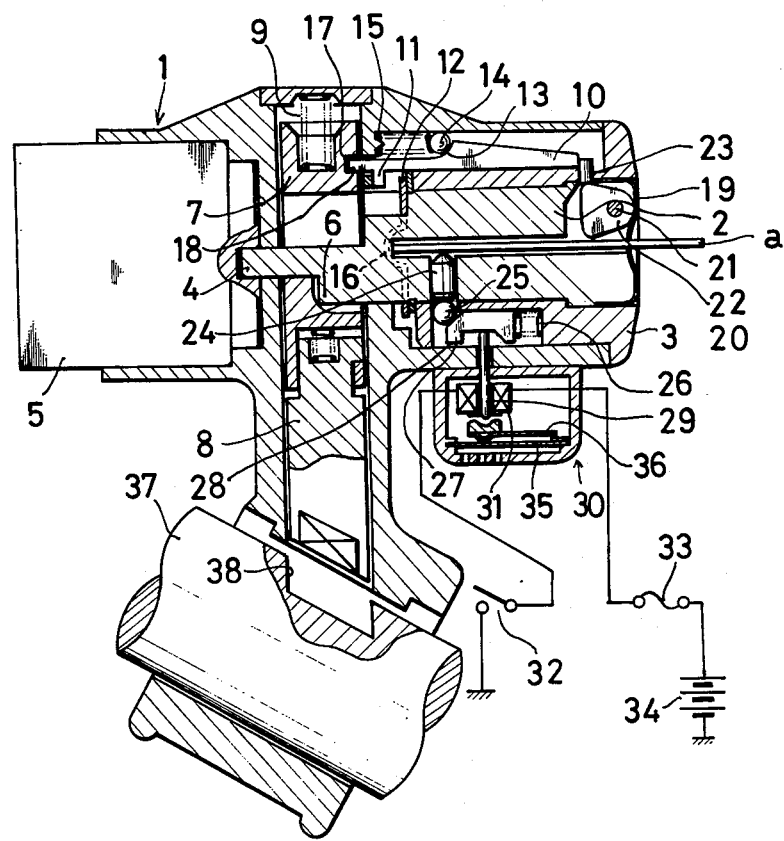
FIG. 3 is a sectional side view similar to that of FIG. 2 but with the switch OFF.

Referring to the drawing, numeral 1 generally denotes a burglar-resistant apparatus according to the invention, the same comprising a lock casing 3 in which a cylinder lock 2 is contained, an electric switch 5 connected to the front end of an operational rod 4 that integrally extends from the lock 2, and a slider member 7 in which a simicircular cam 6 is inserted, the cam 6 being formed at the middle portion of the rod 4.

The member 7 is provided at its front end with a lock pin 8 that can be brought into engagement with a groove 38 provided in a steering shaft 37. The member 7 is provided at its rear end with a spring 9 for biasing the same. By turning the rod 4, the slider member 7 is advanced and retracted along with the lock pin 8.

The lock casing 3 has therein an engaging member 10 which is longitudinally slidable along the side surface of the cylinder lock 2 as well as a receiving member 11 which latter projects from the inside surface of the engaging member 10 and is supported by a cam plate 12 provided on the periphery of the front end portion of the rod 4. The member 10 is urged rearwards, at a step portion 13 formed in the outer surface thereof, by the action of a spring 15 through a ball 14. By turning the clyinder lock 2, the engaging member 10 slides forwards against the action of the spring 15 with the aid of a projecting portion 16 of the cam plate 12, and passes at its front end through an opening 17 in the casing 3 so as to be brought into engagement with an opening 18 in the side surface of the slider member 7.

Additionally, the cylinder lock 2 is provided, in front of a cap 19 applied to the rear end surface thereof, with a lever 21 pivotally supported on a pin 22 so as to project into a keyhole 20. A lever 23, which is urged downwards by a spring (not shown), is provided on the outer side of the lever 21 at substantially right angles thereto, for supporting the rear end portion of the earlier-mentioned engaging member 10.

The cylinder lock 2 is further provided with a contact member 24 projecting into the keyhole 20, and the member 24 is in engagement, through a contact ball 25, with a member 27 that is slidable at right angles thereto and is biased by a spring 26. A control pin 29 which is urged upwards by a spring (not shown) and is guided via the sliding movements of the member 27 by a guide surface 28 thereof is also provided and projects outside the lock casing 3.

Numeral 30 denotes a warning buzzer attached to the lock casing 3, and a door switch 32, arranged to be closed by opening of a door, is connected in series in an electrical power circuit connected to an electromagnetic coil 31 of the buzzer 30 through a fuse 33 and a battery 34. A vibrating member 36 on a plate 35 is so arranged that the control pin 29 is brought into abutment therewith for restraining or suppressing the vibrations thereof.

When, thus a key $a$ is inserted (in FIG. 1) in the keyhole 20, the lever 21 is pushed thereby to swing outwards, and the lever 23 is moved therewith so as to lift the engaging member 10 outwards. At the same time, the contact member 24 is pushed thereby sliding and pushing the contact ball 25 outwards. Accordingly the slider member 27 is moved so as to retract the control pin 29, whereby the vibrating member 36 of the buzzer 30 is released from its restraint.

If, then, the cylinder lock 2 is turned to the ON position by means of the key $a$, as shown in FIG. 2, the member 10 is pushed against the action of the spring 15 by means of the cam plate 12 at the front end, of the rod 4, and at the same time the member 10 is inserted into the opening 18 of the member 7 which has been retracted by the action of the cam 6. Thus, the lock pin 8 is moved from its locking position, as shown in FIG. 2.

In this case, the lever 23, which has previously supported the inner surface of the rear end of the engaging member 10 is slipped off and is positioned to support the rear end surface thereof. Thus the lever 23 serves to prevent the engaging member 10 from retreating.

This condition is maintained even after the engagement between the receiving member 11 of the member 10 and the portion 16 of the plate 12 is terminated by a return movement of the lock 2 by means of the key $a$. This condition is maintained even when the key is turned back to the OFF position, as shown in FIG. 3.

In this OFF condition, if the driver opens a door for getting out of the vehicle, the switch 32 is closed and the buzzer 30 sounds, thereby reminding the driver that he has forgotten to pull out the key. If, however, the key has been drawn in the OFF position, the support of the lever 21 by the key is lost, and the engaging member 10 is released from its support by the lever 23, so that the member 10 retreats by the action of the spring 15 and the engagement thereof with the member 7 is terminated.

Thus the lock pin 8 is advanced by the action of the spring 9 so as to lock the steering shaft 37. At the same time, the contact member 24 is also released from being pushed so that the member 27 is advanced by the action of the spring 26, and accordingly the control pin 29 projects to suppress the vibrating member 36. Thus, the buzzer 30 does not operate even though the circuit thereof is closed by opening a door.

Figure 4:
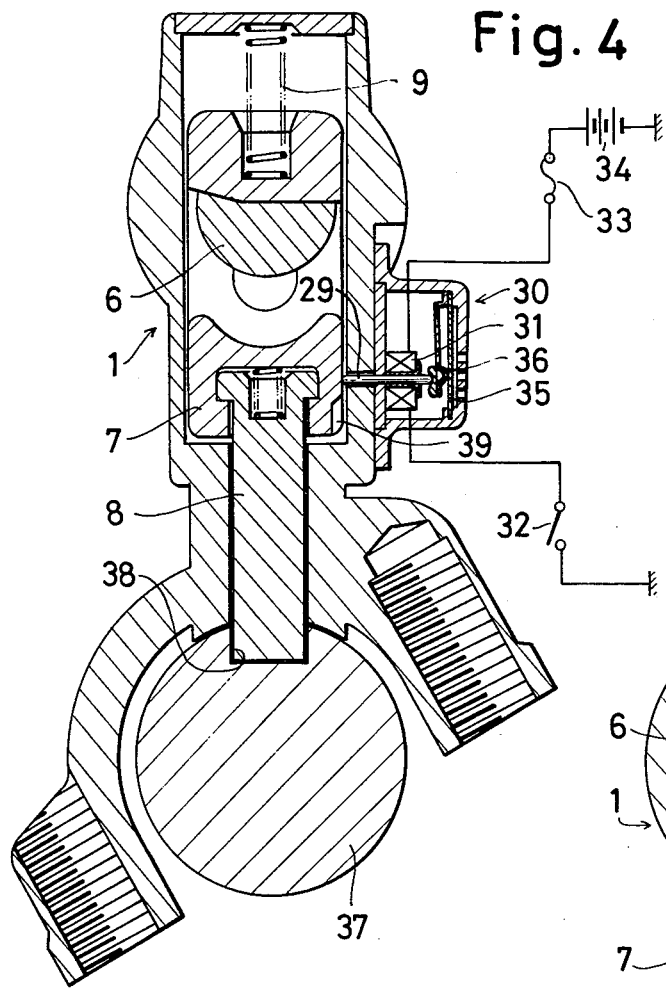
FIG. 4 is a sectional side view of a modified apparatus according to the invention in its locked condition.
Figure 5:
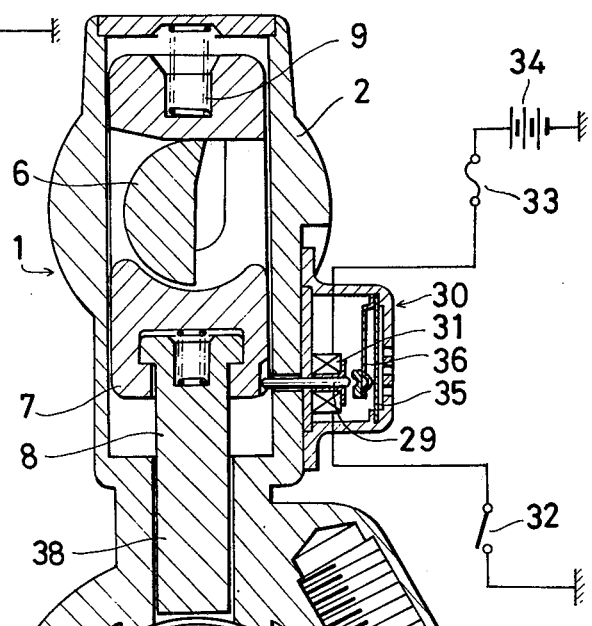
FIG. 5 is a view similar to that of FIG. 4 of the modified apparatus but in the unlocked condition.

FIGS. 4 and 5 show a modified apparatus according to the invention, wherein the buzzer 30 is arranged to be restrained, regardless of insertion or pulling out of the key, in conjunction with the movement of the lock pin 8 of the apparatus 1. In order that the control pin 29, for restraining the vibrations of the member 36, may be controlled by the member 7 which is movable with the lock pin 8, the member 7 is formed at one side surface with a stepped portion 39. The control pin 29 which is urged inwards by a spring (not shown) is in abutment with the portion 39.

If the cylinder lock 2 is turned by operating the key, the member 7 is moved via the cam 6, whereby the lock pin 8 is brought either into its locking position, in which the steering shaft 37 cannot be turned (see FIG. 4), or into its unlocking position, in which the shaft 37 is turnable (as shown in FIG. 5).

In the locking position, the member 36 of the buzzer 30 is suppressed by the control pin 29 so that the buzzer 30 does not operate even though the electrical circuit of the buzzer is closed when the door switch 32 is operated by opening of a door.

In the unlocking position, the vibrating member 36 of the buzzer 30 is released from its restraint, so that when the driver opens the door for leaving the vehicle, and the door switch 32 is closed, the buzzer 30 buzzes to remind him that he has forgotten to lock.

Figure 6:
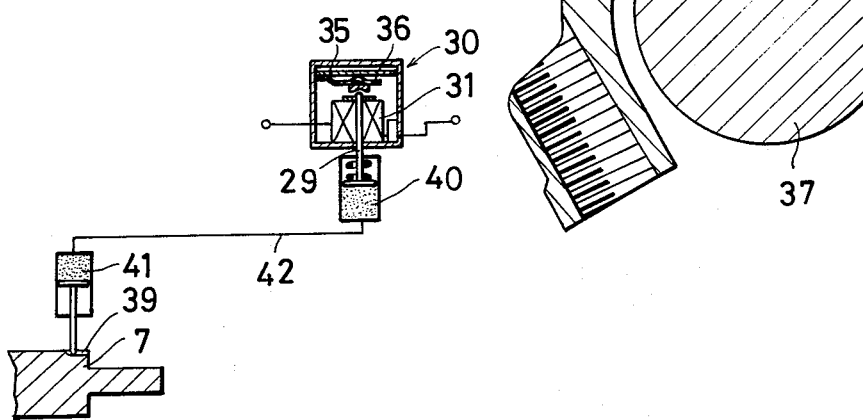
FIG. 6 is a sectional, partial side view illustrating a modified attaching arrangement for a buzzer.

The warning buzzer 30 may be provided at a position separate from the burglar-resistant apparatus 1 as shown in FIG. 6. In this case, the control pin 29 is constructed as the piston rod of an operational cylinder 40, and the stepped portion 39 is engaged by the a piston rod of a driving cylinder 41, the cylinders 40, 41 being interconnected through a flexible pipe 42.

It will be understood that the present invention relates only to exemplary, preferred embodiments of the inventive apparatus, wherein various modifications, additions and/or changes can be made without departing from the spirit and scope of the invention.

What I claim is:

1. An apparatus for warning that a key-operated device in a vehicle is inoperative where said vehicle has a door and normally open switch means adapted to be closed when said door is opened, said apparatus comprising:
   a. a warning buzzer having a vibratory member for emitting a warning when said door is open and said key-operated device is inoperative, said vibratory member being actuable upon closing of said switch means; and
   b. a control pin interposed between said vibratory member and said key-operated device, said control pin being movable in response to movement of said key-operated device, and said control pin being arranged to move from a first position when said key-operated device is operative and in which said control pin mechanically restrains said vibratory member from vibrating to a second position when said key-operated device is inoperative and in which said vibratory member is free of restraint by said control pin.

2. the apparatus as defined in claim 1, wherein said control pin is so arranged that it is movable via a contact member that is slidable by its contact with a key insertable in said key-operated device.

3. The apparatus as defined in claim 1, wherein said key-operated device constitutes a burglar-resistant apparatus including means for locking a steering shaft of said vehicle to prevent its rotation, said control pin being movable via a lock pin which forms part of said burglar-resistant apparatus and is engageable with said steering shaft.

4. The apparatus as defined in claim 1, wherein said buzzer is attached to a casing of said key-operated device, thereby allowing said control pin to be mechanically ganged with the mechanism of said buzzer.

5. The apparatus as defined in claim 1, wherein said key-operated device includes a cylinder lock an operational rod extending integrally therefrom, and an electric switch connected with said rod.

6. The apparatus as defined in claim 5, wherein said key-operated device further includes a lock pin for said steering shaft, operable by turning of said operational rod.

7. The apparatus as defined in claim 6, wherein said cylinder lock is provided with an engaging member arranged to be advanced by the action of a cam plate which latter is in engagement with said lock pin, and a lever arranged to be moved by the insertion of a key, for preventing retraction of said engaging member.

8. The apparatus as defined in claim 6, wherein said cylinder lock is provided with a contact member projecting into a keyhole, and a slidable member in engagement with said contact member through a contact ball, said slidable member having a surface for guiding said control pin.

* * * * *